Dec. 23, 1941.     S. RUZICKA     2,266,816
MANUFACTURE OF HIGH GRADE IRON AND STEEL
Filed June 15, 1940
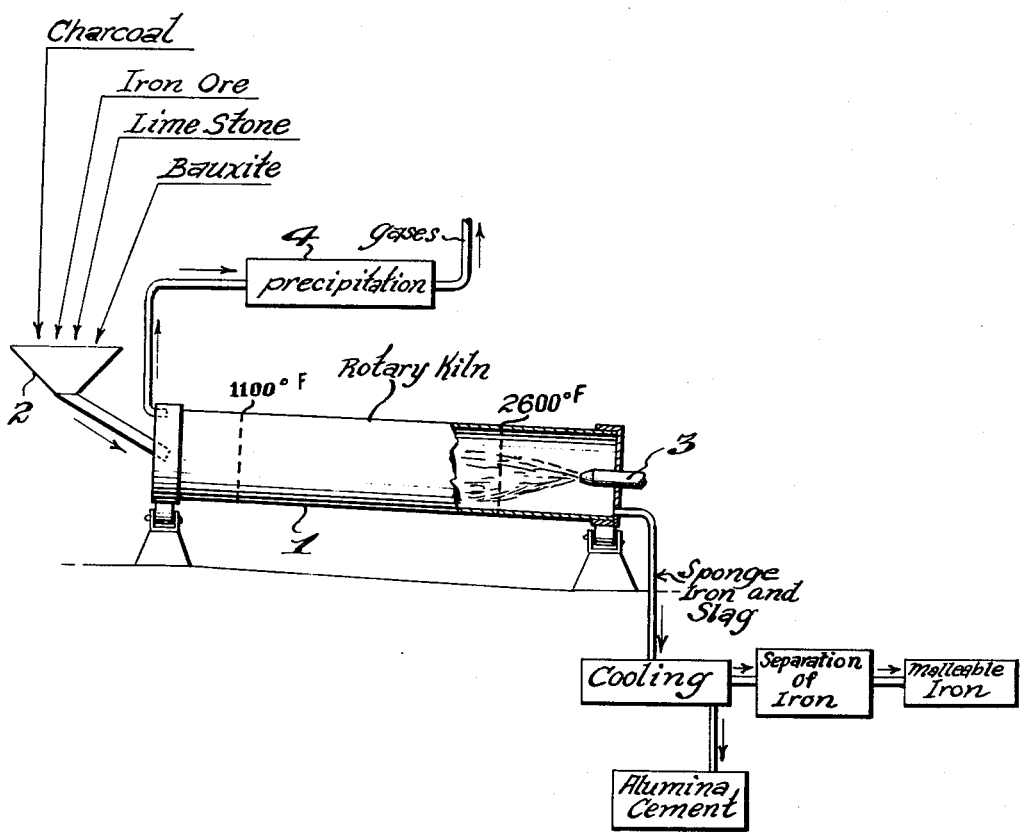

Patented Dec. 23, 1941

2,266,816

UNITED STATES PATENT OFFICE 2,266,816

MANUFACTURE OF HIGH GRADE IRON AND STEEL

Stevan Ruzicka, Washington, D. C.

Application June 15, 1940, Serial No. 340,794

16 Claims. (Cl. 75—30)

This invention relates to manufacture of high grade iron and steel; and it comprises a process of manufacturing a high-grade malleable iron or a steel directly from the ore, said process comprising mixing an iron ore with limestone, an aluminiferous ore and a substantially ash-free reducing agent, such as charcoal or wood; the proportions of limestone and alumina in the charge being such as to produce a quick-setting alumina cement during the process; passing the mixture through a rotary kiln fired with a substantially ash-free flame, the maximum temperature reached in the kiln being within the range of about 2400° to 2700° F., whereby a viscous slag is produced containing blooms of iron or steel in suspension therein; cooling the resulting product and separating the iron or steel from the slag; all as more fully hereinafter set forth and as claimed.

Several different methods have been described in the art for manufacturing technical iron or steel directly from the ore. Several of these methods have proved to be impracticable or inoperative and the only one which is now being used with any substantial commercial success is conducted only with considerable difficulty. In this method the iron ore is mixed with coal or coke and slag-forming ingredients and this mixture is passed through a rotary kiln where blooms of technical iron are formed, these blooms being then melted down in a blast furnace. The coke or coal employed in this process contains impurities of sulfur, phosphorus etc. which are taken up by the iron and must be eliminated in subsequent operations. The slag forming ingredients produce a liquid slag which is incapable of holding the reducing agent and sponge iron in suspension therein. This results in several disadvantages since the sponge iron lumps, being heavier, fall to the bottom and tend to adhere to and damage the fittings of the furnace. These iron lumps are difficult to remove and are the cause of frequent shut-downs. The coal or coke reducing agent tends to become segregated and to float on top of the liquid slag. Of course any reducing agent which floats on the slag burns on the surface of the charge and comes in contact with the iron ore only imperfectly. This causes a loss of fuel and prevents the iron ore from being reduced homogeneously and completely. The yields obtained in this process are only of the order of about 70 per cent owing to the imperfect reduction of the iron ore etc. And the slag which is recovered from the process has no commercial value whatever. This process can thus be considered merely an ore-enriching method.

In the usual blast furnace method of producing iron, it has been considered necessary to employ coke from coal as a reducing agent owing to the fact that the reducing agent must have a considerable mechanical strength for satisfactory operation of the blast furnace. The use of this reducing agent results in a pig iron which is highly impure. But in a recent patent, No. 2,184,318, I have described an improved blast furnace method in which a substantially ash-free coke of high mechanical strength is employed and wherein certain slag forming ingredients are used which are capable of producing an alumina cement as a by-product of the blast furnace operation. A high-grade malleable iron, substantially free from impurities is produced in this process.

I have now found that it is possible to employ slag-forming ingredients, which are adapted to form a quick-setting alumina cement as a by-product, in a new rotary kiln process and have also found, surprisingly, that the use of these particular slag forming ingredients eliminates the various difficulties which are mentioned above as being present in the prior art rotary kiln methods. This new process enables the direct, simultaneous and continuous production of a high-grade, pure, malleable (wrought) iron or steel and a quick setting alumina cement of high quality.

In this new process it is not necessary that the reducing agent possess any material mechanical strength. It is therefore possible to employ any type of charcoal, produced by any of the conventional methods, at any temperature and with or without by-product recovery. Even wood may be employed as a reducing agent, this wood being converted into charcoal during the process. It is also possible to employ charcoal which has been molded with a carbonizable binder into the form of briquets, with or without subsequent carbonization at any temperature, and sulfur-free petroleum coke is also suitable. In fact any substantially ash-free solid carbonaceous reducing agent can be employed.

The slag-forming ingredients employed in this process are usually limestone and bauxite although certain modifications and additions can be made, since I have found that, if these slag-forming ingredients are so-chosen as to produce any of the usual quick setting alumina cements, the resulting slags will possess high viscosities and tenacities at the maximum temperatures used in the process, owing to their content of calcium titanates, aluminates and silicates. These maximum temperatures are usually within the range of 2400° to 2700° F. The viscosities of these slags are sufficient to prevent segregation of the charge in the furnace, that is, the reducing agent is maintained in uniform admixture and the sponge iron blooms or balls which are formed do not settle out but are maintained in suspension. These blooms do not tend to adhere to the furnace fittings, owing to the formation of a protective film of viscous slag which adheres to these fittings, and shut-downs from this cause are completely eliminated. Owing to the excellent contact secured between the reducing agent and the iron ore, the latter is reduced substantially completely, a yield of approximately 95 per cent being obtained. These specific and advantageous results secured in my process are primarily due to the use of my bauxite slags.

In the acknowledged commercial process employing a rotary kiln, it is commercially impracticable to employ charcoal as a reducing agent owing to the increased cost of this material. But in my new process, the value of the quick-setting alumina cement obtained as a by-product is such that the use of more expensive reducing agents, such as charcoal, is commercially feasible.

To compare my process with the prior art rotary kiln process, it has been found that, with the use of a rotary kiln 50 meters in length and 3.6 meters in diameter, a production of about 300 tons of technical iron per day is possible, using the prior art process. With my new process the production of iron, using the same kiln, is increased to substantially 400 tons daily, this iron being, of course, of much higher quality. And I also obtain simultaneously a production of no less than 300 tons of alumina cement as a valuable by-product. With rotary kilns having a length of 100 meters and a diameter of 5 to 6 meters, it is possible to increase the daily production of malleable iron obtained by my process to 1000 tons of iron and 800 tons of cement per day.

The cost of erecting a plant for producing malleable iron by my process is roughly one-fifth of that required for the erection of a blast furnace having an equal production, with a Thomas steel plant, this figure not including the cost of the coke oven plant used in connection with the blast furnace. The total production cost, when allowance is made for the value of the alumina cement, is about one-half, in comparison with the blast furnace method. The saving in labor obtained in my process is approximately 75 per cent.

The alumina cement obtained as a by-product in my process compares favorably with any of those which are now manufactured directly. The following represents the approximate analysis of the cement which is usually obtained in my process:

| | |
|---|---|
| $SiO_2$ | 3.7— 9.9% |
| $Al_2O_3$ | 35 — 44 |
| $Fe_2O_3$ | 0 — 10% |
| $TiO_2$ | 1.7— 4.0 |
| $CaO$ | 36 — 44% |
| $MgO$ | 0 — 1.4 |
| $Na_2O$ | 0 — 0.5% |
| $K_2O$ | 0 — 1.2 |

The compositions and proportions of the slag-forming ingredients, which are required to produce alumina cements, corresponding to the above analysis, can be readily calculated when the analyses of the iron ore and bauxite are known. The alkaline ingredients present in the charcoal or wood, being fluxing agents, enter into the cement. The quantity of bauxite to be used depends upon the silica content of the bauxite used, as well as upon the silica content of the iron ore.

Sufficient reducing agent has to be provided in the process for the complete reduction of the iron ore and usually of at least part of the iron oxide content of the bauxite. Part of the iron content of the bauxite is recovered as iron in the process. It is essential, however, for the production of a substantially carbon-free iron, that not all of the iron oxide in the charge be reduced in the process. For the production of a high-grade steel, it is possible to increase the carbon content of the charge to the required amount. Owing to the ideal reactivity of the charcoal during the reducing operation there is a steady production of carbon monoxide which covers the surface of the charge thus preventing the reoxidation of the sponge iron and the blooms.

The details of my process can be described conveniently in connection with the accompanying drawing which represents a flow sheet of my process. This drawing has descriptive legends from which the process is believed to be self evident.

The rotary kiln 1 shown in the drawing is of the type used in the manufacture of Portland cement for example. This is charged through funnel 2 with a mixture of a solid fuel, which may be charcoal, wood or the like, iron ore, limestone and bauxite, the latter two ingredients being added in the proportions required to produce a quick setting alumina cement. The furnace is heated by means of a blast flame or injector 3 introduced at its discharge end, the fuel used being pulverized charcoal, fuel oil or some other substantially ash-free type of fuel. Purified coke oven gas or natural gas can be used and it is also possible to employ as a fuel the wood tar which is recovered in the process. The air used in this blast is preferably preheated. Only from about 10 to 20 per cent of the heat required in the process is furnished by the blast, the remaining heat being derived from the heat of the reaction and the combustion of the charcoal in the charge.

The charge enters the higher end of the furnace and slowly passes to the discharge end owing to the slight slope of the furnace. The furnace is fired in such manner that the temperature reached, after the charge has passed through about one-fourth to one-fifth of the length of the furnace, is about 1100° F., at which temperature reduction commences, while the temperature reached at a point about three-fourths to four-fifths through the furnace is about 2600° F.

During passage of the charge through the furnace, the iron ore is reduced to sponge iron and this is compressed in lumps or blooms which increase in size owing to the agitation and welding tendency of the iron, these blooms eventually reaching sizes up to 30 centimeters in diameter. The slag formed in the process is so viscous, however, that these blooms of iron remain in suspension and do not collect on the bottom of the furnace. The reducing agent, which is advantageously of charcoal reduced to nut size or below, also remains thoroughly admixed with the charge and thus reacts efficiently and homogeneously with the iron ore because of its high reactivity. If wood is used as a reducing agent, it should be dried preferably to a moisture content below 20 per cent before charging. This wood, of course, undergoes destructive distillation and carbonization at the upper end of the furnace.

The sponge iron blooms and slag pass out at the lower end of the furnace and are then cooled, usually by air or water. These reaction products are then separated, which is accomplished most conveniently by a coarse crushing operation adapted to remove any adherent slag particles from the blooms. The blooms which are larger than about 5 mm. can then be separated from the slag by a screening operation, the remaining product being ground to a particle size of about one-tenth millimeter, after which additional sponge iron can be separated magnetically. The remaining product, which still contains a small amount of iron, can be finely ground and again subjected to a magnetic separation step. The slag which is thus recovered in a finely divided state is ready for immediate use as a quick-setting cement. The blooms recovered can either be welded, followed by heating and rolling or they may be melted down in a furnace and cast into ingots of highly pure wrought iron or steel.

While I have described what I consider to be the best embodiments of my process, it is evident, of course, that various modifications can be made in the specific procedures described without departing from the purview of this invention. One important advantage derived from my process is that the alkali metal content of the cement, which is derived from the reducing agent employed in the process, is distributed very homogeneously throughout the mass so that, although the cement sets very rapidly, no cracks are formed owing to the homogeneous character of the set product. Another advantage is that highly impure bauxites may be employed which, previous to the present invention, could be economically employed neither for the manufacture of aluminum nor alumina cements.

Any iron oxide in the bauxite takes part in the process, either being reduced to iron or serving to prevent the absorption of carbon by the iron. If the silica content of the bauxite is excessive, this can be overcome by replacing part of the limestone by means of fluorspar. In this case volatile silicon fluorides are produced in the process which can be recovered from the gases by means of electrical precipitation, as indicated at 4 in the drawing. Other valuable by-products can be recovered from the gases evolved in the process by passage through a dust precipitation chamber.

As mentioned previously, any type of ash-free carbonaceous reducing agent can be used in my process. This includes wood wastes, such as sawdust, for example. And very primitive methods can be used for the making of the charcoal without the necessity of recovering any by-products. Mixtures of reducing agents of this general type can be employed.

The two factors, which render the use of ordinary charcoal in the blast furnace impossible or impracticable, namely, lack of mechanical strength and high cost, are not effective in the present process, which permits the continuous production of two valuable products in one simple rotary furnace, which can be made in units having lengths of 300 feet or over and diameters of 15 to 18 feet or more. This single unit replaces the various equipments, such as coke oven plants, blast furnaces and steel plants, with the necessary accessories, which are required in prior art processes. The refractory employed in this furnace can be of the inexpensive Chamotte type, the expensive refractories used in the present iron and steel making processes being unnecessary. Owing to the lower temperature required in my process the consumption of fuel is considerably lower than that obtained in the blast furnace. And it is possible, of course, to employ conventional heat recuperating means, if desired.

Another important advantage which is secured by my process is that iron ores having a very fine grain size can be employed. Such ores cannot be reduced in the usual blast furnace. And, while I have limited the description to the reduction of iron ores, my process is equally applicable to other easily reducible oxide ores such as nickel or nickel-iron ores which can be reduced directly or after blending with iron ores for the production of ferro-nickel or other alloys of high purity. Iron ores having an alumina content are, of course, particularly suitable for use in my process. My process is also adapted to the reduction of ores other than oxides, such as carbonates and silicates. Other modifications of my invention which fall within the scope of the following claims will be immediately evident to those skilled in this art.

What I claim is:

1. In the manufacture of metals and alloys from easily reducible oxide ores, the process which comprises mixing such an ore with a substantially ash-free, solid carbonaceous fuel and with aluminous and calcareous slag-forming ingredients of such composition and in such proportions as to produce a quick-setting alumina cement forming a viscous melt during the process, passing said mixture through a sloping rotary kiln at a temperature sufficiently high to cause reduction of said ore to sponge metal with the formation of a viscous slag, cooling the resulting products and separating the metal from the slag.

2. The process of claim 1 wherein the said ore is an iron ore.

3. The process of claim 1 wherein the said ore is nickel ore.

4. The process of claim 1 wherein the slag-forming ingredients mixed with the ore comprise bauxite and limestone.

5. The process of claim 1 wherein the slag-forming ingredients mixed with the ore comprise bauxite and fluorspar.

6. In the simultaneous and continuous manufacture of quick-setting alumina cements and iron or steel of high purity, the process which comprises mixing an iron oxide ore with a substantially ash-free, solid carbonaceous reducing agent and with aluminous and calcareous slag-forming ingredients of the type adapted to produce a quick-setting alumina cement forming a viscous melt during the process, passing the resulting mixture through a sloping, revolving reaction zone in which the maximum temperatures reached are within the range of about 2400° to 2700° F., whereby sponge iron blooms are formed suspended in a viscous slag, and separating the sponge iron from the slag.

7. The process of claim 6 wherein said slag-forming ingredients comprise limestone and bauxite.

8. The process of claim 6 wherein the solid fuel is employed in such proportions that the iron oxide content of the ore is all reduced while that of the bauxite is only partly reduced, whereby a malleable iron is produced in the process.

9. The process of claim 6 wherein said solid fuel is employed in excess of such proportions that the entire iron oxide content of the charge is reduced, whereby a high grade steel is produced.

10. The process of claim 6 wherein the said blooms are separated from the slag by a crushing step followed by magnetic separation.

11. The process of claim 6 wherein the solid fuel employed is a charcoal.

12. The process of claim 6 wherein the solid fuel employed is wood.

13. In the simultaneous and continuous manufacture of quick-setting alumina cements and iron or steel of high purity, the process which comprises mixing an iron oxide ore with charcoal and with limestone and bauxite in such proportions as to produce a quick-setting alumina cement forming a viscous melt during the process, passing said mixture through a sloping, rotating reaction zone in which the maximum temperature reached is within the range of about 2400° to 2700° F., whereby blooms of sponge iron are formed suspended in a viscous slag of an alumina cement, and separating said sponge iron from said cement.

14. The process of claim 13 wherein at least part of the limestone is replaced by fluorspar and wherein silicon fluorides are recovered from the gases evolved in the process.

15. In the simultaneous and continuous manufacture of quick-setting alumina cements and iron or steel of high purity, the process which comprises mixing an iron oxide ore with a substantially ash-free solid carbonaceous reducing agent and with aluminous and calcareous slag forming ingredients of such composition and in such proportions as to produce a slag forming a viscous melt during the process having substantially the following composition:

| | |
|---|---|
| $SiO_2$ | 3.7—9.9% |
| $Al_2O_3$ | 35 — 44 |
| $Fe_2O_3$ | 0 —10% |
| $TiO_2$ | 1.7— 4.0 |
| CaO | 36 —44% |
| MgO | 0 — 1.4 |
| $Na_2O$ | 0 —0.5% |
| $K_2O$ | 0 — 1.2 | passing said mixture through a sloping, rotating reaction zone maintained at temperatures sufficiently high to produce a viscous slag and to cause reduction of said iron ore, whereby blooms of sponge iron are formed, and separating said sponge iron from the resulting alumina cement.

16. In the simultaneous and continuous manufacture of quick-setting alumina cements and iron or steel of high purity, the process which comprises mixing an iron oxide ore with a finely divided wood and with aluminous and calcareous slag forming ingredients in such proportions as to produce a quick-setting alumina cement forming a viscous melt during the process, passing said mixture through a sloping, rotating reaction zone in which the maximum temperature reached is within the range of about 2400° to 2700° F., whereby said wood is destructively distilled followed by carbonization and the iron is reduced thereby to blooms of sponge iron suspended in a viscous slag of an alumina cement, and separating said sponge iron from said cement.

STEVAN RUZICKA.